3,178,336
BIS-DITHIOCARBAMATE FUNGICIDES
Michele Mugno, Milan, Italy, assignor to Montecatini Società Generale per l'Industria Mineraria e Chimica, Milan, Italy
No Drawing. Filed June 7, 1960, Ser. No. 34,349
Claims priority, application Italy, June 17, 1959, 10,089/59
2 Claims. (Cl. 167—22)

This invention relates to fungicidal compounds of the class of bis-dithiocarbamates, having the general formula:

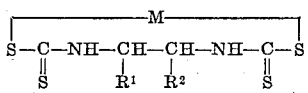

where M is preferably either zinc or calcium, $R^1$ is an aliphatic monovalent radical and $R^2$ is an atom of hydrogen or an aliphatic monovalent radical.

A further object of the present invention is to provide an advantageous method for the preparation of said fungicidal compounds, starting from alkyl-amines of the following type:

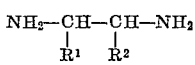

where $R^1$ and $R^2$ have the meaning specified above.

Research carried out by Klöpping (Rec. des trav. chim. des Pays-Bas, 1951, page 918) has shown that the fungicidal activity of salts or esters of the products obtained by oxidation of di-N-substitutes of dithiocarbamic acid,

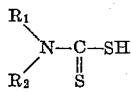

is very high when $R_1$ and $R_2$ are $CH_3$. In the case of $C_2H_5$ groups the products are slightly less active, and if $R_1$ and $R_2$ are higher alkyl derivatives, or are aryl derivatives, the compound is practically inactive.

Dimond, Heuberger and Hersfall (Rec. des trav. chim. des Pays-Bas, 1951, page 949) reported in 1943, on the very high fungicidal activity of sodium ethylene-bis-dithiocarbamate, while later on Heuberger and Manns demonstrated that the addition of zinc or calcium salts gives the product a strong protective action in respect to its persistence on the surface of the plant being treated.

It is known that, if the number of carbon atoms of the aliphatic chain is increased, or if the hydrogen in the secondary amino groups is replaced by lower alkyl radicals, the fungicidal activity in the bis-dithiocarbamates is greatly reduced. Thus, whereas zinc ethylene-bis-dithiocarbamate has high fungicidal activity, the analogous products that contain an aliphatic chain having a greater number of carbon atoms (such as, for example, the series of zinc tetramethylene-, zinc hexamethylene-, zinc octomethylene-, or zinc decamethylene-bis-dithiocarbamate compounds) present a progressively decreasing activity. Methylation of the secondary aminic groups in the zinc ethylene-bis-dithiocarbamate reduces the activity of said substance by about 100 times.

The applicant has now surprisingly found that by replacing with an alkyl radical a hydrogen atom bound to a carbon atom instead of to a nitrogen atom, the fungicidal activity of the compound remains practically the same. This fact is doubly surprising because it was expected, in view of the above facts, that the fungicidal activity of the compound would decrease proportionally to increase in the number of carbon atoms in the aliphatic chain.

The object of the present invention is to provide compounds having a high fungicidal activity having the following general Formula A:

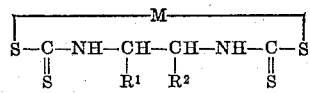

where M is preferably zinc or calcium, and $R^1$ is an aliphatic monovalent radical and $R^2$ a hydrogen atom or an aliphatic monovalent radical.

The applicant has thus provided products having an aliphatic chain with more than two atoms of carbon the fungicidal activity of which is comparable to that of zinc ethylene-bis-dithiocarbamate. A characteristic of the new products is that the two aminic groups are bound to two adjacent atoms of carbon. The following table presents comparative biological test data on zinc ethylethylene-bis-dithiocarbamate, a compound included in the general Formula A, and zinc ethylene-bis-dithiocarbamate:

TABLE NO. 1.—FUNGICIDAL ACTIVITY OF ZINC ETHYL-ETHYLENE-BIS-DITHIOCARBAMATE (FORMULATIONS A, B, C) COMPARED TO THE ACTIVITY OF ZINC ETHYLENE-BIS-DITHIOCARBAMATE

| Products | Percentage of surface struck by Peronospera | | | | DL 95, p.p.m. |
|---|---|---|---|---|---|
| | 150 p.p.m. | 75 p.p.m. | 37.5 p.p.m. | 18.75 p.p.m. | |
| Zinc ethylene-bis-dithiocarbamate | 0.12 (7) | 4.69 (6) | 19.37 (7) | 46.99 (5) | 72 |
| Formulation A | | 0.15 (2) | 1.19 (3) | 2.57 (2) | 21 |
| Formulation B | | 0.025 (2) | 1.95 (3) | 12.79 (2) | 27 |
| Formulation C | | 0.02 (2) | 0.16 (3) | 4.13 (2) | 18 |

The figures between parentheses represent the number of data obtained in each single test, on the basis of which the above average percentages were calculated.

As a control product a commercial formulation of zinc eythlene-bis-dithiocarbamate, containing 74.36% of active compound was used; the active-substance content of the formulations to be examined A, B, and C was taken into account and in each test the products were used in equiamounts of active substance. The products were used in aqueous suspension and applied onto the plants by spraying.

The tests were carried out on vines infested by *Plasmopara viticola*. The results obtained are expressed as percent of leaf surface attacked by mildew in respect of the surface of the control leaves considered as 100.

From the Table No. 1 it appears that the immediate activity (calculated at the level of LD 95) of the formulations A, B and C is remarkably higher than that of the commercial zinc ethylene-bis-dithocarbamate.

In other tests, zinc methyl-ethylene-bis- dithocarbamate, i.e., a compound comprised in the general Formula A, showed a 200% higher activity than that of the commercial zinc ethylene-bis-dithiocarbamate on *Plasmopara viticola* and 400% higher on French bean rust caused by *Uromyces appendicolatus* or *Uromyces phaseoli*.

Also zinc ethyl-ethylène-bis-dithiocarbamate presents an activity immediately superior to that of the commercial zinc-ethylene-bis-dithiocarbamate for the 3 aforementioned parasites.

A further object of the present invention is to provide a method for preparation of compounds comprised in general Formula A, by reacting alkyl-amines of the general formula

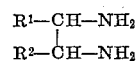

where $R^1$ is an aliphatic monovalent radical and $R^2$ a hydrogen atom or an aliphatic monovalent radical, with $CS_2$, NaOH, or $NH_4OH$ and a soluble salt of zinc or of calcium, such as the chlorides.

The diamine is reacted with $CS_2$, at a temperature between 30 to 40° C., to which mixture NaOH or $NH_4OH$ and finally the metal salt, such as Zn or Ca soluble salts viz. zinc chloride or calcium chloride, are added. Another order for the introduction of the reagents can be followed: for example, a mixture of $CS_2$ and $NH_3$ is prepared to which is then added the diamine, etc.

The aliphatic radicals $R^1$ and $R^2$ sometimes impart to the zinc bis-dithiocarbamate mixture hydrophobic properties which prevent the compound from being uniformly dispersed in water.

This inconvenience is obviated by adding wetting agents to the fungicide, for example 3% lauryl sodium sulfonate.

The following examples illustrate the invention but are not intended to limit it:

Example 1

1,2-dichloropropane, obtained by additive chlorination of propylene, is made to react in a 70% ammonia water solution, at the rate of 25–50 mols of $NH_3$ for each mol of dichloro derivative. The 1,2-propylene-diamine (boiling point: 119 to 125° C.) is separated by fractional distillation of the anhydrous raw product containing 10% impurities consisting of polyamines and residue. 222 g. of 1,2-propylene-diamine (3 mols) in 1760 ml. of $H_2O$ (96.6 mols) are reacted with 480 gr. of carbon sulfide (6.3 mols) in a 5-liter flask provided with an agitator and maintained at 35° C. The addition of $CS_2$ to the amine takes place over a period of about 45 minutes. 102 grams of $NH_3$ (6 mols) are diluted in water, to obtain a 30% solution. The solution is added in the presence of an indicator, to continuously control the pH of the reaction mixture by contact test, so as to maintain a pH of 7 to 8. Eventually, excess ammonia is added until the pH is 7. The solution is then poured into a cylinder made of enameled ceramic having a capacity of 14 liters, and provided with a solid and rapid agitator. 409 g. of $ZnCl_2$ (3 mols) diluted in 1,200 ml. $H_2O$ are then added during a 45 minute period, at a temperature of 30 to 35° C., the suspension being then diluted with 9 liters of water. A raw product is thus obtained, in a yield of almost theoretical weight, and containing nearly 91% of active substance, which is zinc methyl-ethylene-bis-dithiocarbamate of the formula:

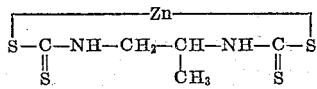

Example 2

1,2-dichlorobutane, obtained from butene-1 by additive chlorination, is reacted as in the previous example. The anhydrous raw product, after having been submitted to fractionation has a concentration of 1,2-butylene-diamine of over 90%.

The percentage of active substance in the zinc ethyl-ethylene-bis-dithiocarbamate is of nearly 90 to 92%. The product has the formula:

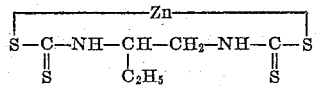

Example 3

The operation is carried out with butene-2 under the above-indicated conditions. The yields obtained are the same. The product is zinc dimethyl-ethylene-bis-dithiocarbamate of the formula:

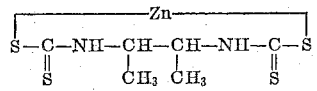

Example 4

74 g. (1 mole) of 1,2-propylene diamine and 594 g. (33 mols) of water are introduced into a 2-litre flask provided with a thermometer, a stirrer, a graduated funnel and a reflux condenser.

160 g. (2.1 mols) of $CS_2$ are added dropwise through the separatory funnel within about 30 minutes to the aqueous diamine solution. After adding some phenolphthalein as indicator, about 2 mols 28–30% aqueous ammonia solution are dropwise added within about 2 hours until a stable alkaline pH is reached.

From the obtained orange solution, containing ammonium methylethylene-bis-dithiocarbamate, the excess of $NH_3$ and $CS_2$ are removed by means of a nitrogen stream; the solution is then poured into a 2-litre glass and is treated with 111 g. (1 mole) of $CaCl_2$ in 400 g. of water. By addition of $CaCl_2$ carried out at 30° C. within 15 minutes, the calcium methyl-ethylene-bis-dithiocarbamate is obtained.

The new fungicides are formulated as dusts with talc or the like, or in aqueous or organic solvent solutions or dispersions, with or without the additives or dispersing agents disclosed above and in the prior art relating to application of zinc, calcium, or sodium ethylene-bis-dithiocarbamate.

I claim:

1. In the art of protecting plants from attack by fungi, the improvement comprising applying to the plants the fungicide, zinc methyl-ethylene-bis-dithiocarbamate of the formula:

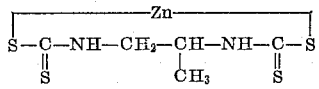

2. In the art of protecting plants from attack by fungi, the improvement comprising applying to the plants the fungicide, zinc ethyl-ethylene-bis-dithiocarbamate of the formula:

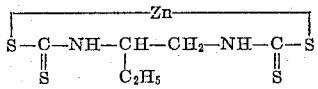

References Cited by the Examiner

UNITED STATES PATENTS

| | | | |
|---|---|---|---|
| Re. 20,869 | 10/38 | Bousquet et al. | 167—22 |
| Re. 22,750 | 4/46 | Tisdale et al. | 167—22 |
| 2,060,733 | 11/36 | Hunt et al. | 260—455 |
| 2,160,880 | 6/39 | Loane et al. | 260—455 |
| 2,444,660 | 7/48 | Mathes | 260—429 |
| 2,492,314 | 12/49 | Olin et al. | 260—429.9 |
| 2,545,948 | 3/51 | Flenner | 167—22 |
| 2,854,467 | 9/58 | Harman | 260—455 |
| 2,885,416 | 5/59 | Costabello et al. | 260—429.9 |
| 2,974,082 | 3/61 | Collins | 167—22 |

LEWIS GOTTS, *Primary Examiner.*

M. O. WOLK, JULIAN S. LEVITT, *Examiners.*